W. H. STEWART.
STARTING DEVICE FOR WAGONS.
APPLICATION FILED DEC. 7, 1907.

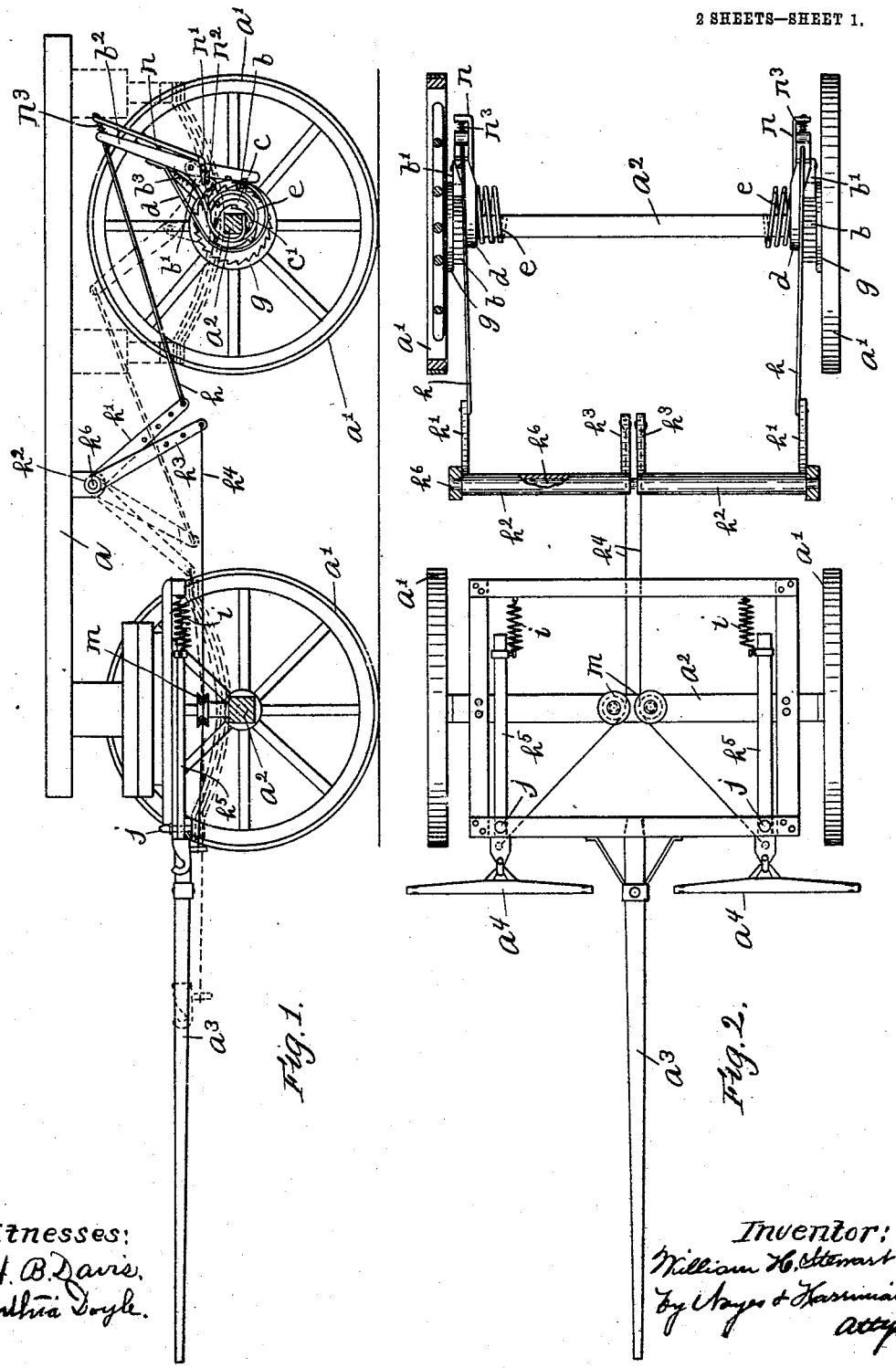

908,514.

Patented Jan. 5, 1909.

2 SHEETS—SHEET 2.

Witnesses:
H. B. Davis.
Cynthia Doyle.

Inventor;
William H. Stewart.
by Hayes & Hanmau.
Attys.

UNITED STATES PATENT OFFICE.

WILLIAM H. STEWART, OF ST. LOUIS, MISSOURI.

STARTING DEVICE FOR WAGONS.

No. 908,514.  Specification of Letters Patent.  Patented Jan. 5, 1909.

Application filed December 7, 1907. Serial No. 405,534.

*To all whom it may concern:*

Be it known that I, WILLIAM H. STEWART, of St. Louis, State of Missouri, have invented an Improvement in Starting Devices for Wagons, of which the following description, in connection with the accompanying drawings, is a specification, like characters on the drawings representing like parts.

This invention relates to appliances for wagons and other vehicles for the purpose of starting heavy loads, and has for its object to provide the running gear of the vehicle, having freely revoluble wheels, with means for positively rotating any one or more of said wheels and also for providing means for connecting said positively actuating means with the draft appliance whereby it may be operated by the horse or horses to positively rotate the wheels and thereby start the load.

The invention consists essentially in a ratchet clutch mechanism connected with one or both of the wheels, an actuating-lever connected therewith which is adapted to be operated to in turn operate the clutch and positively rotate the wheel, and means for connecting said actuating-lever with the draft appliance, whereby it may be operated by a forward movement thereof.

Figure 3:
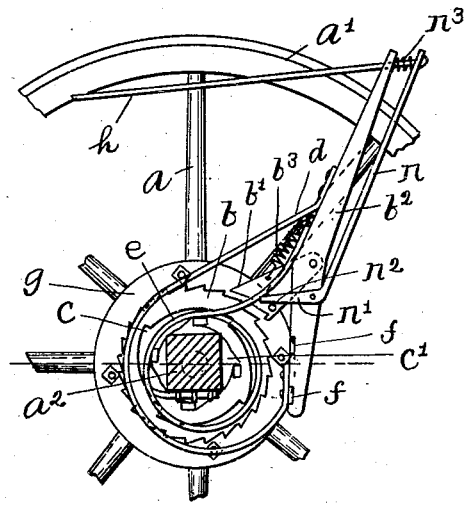
Figure 4:
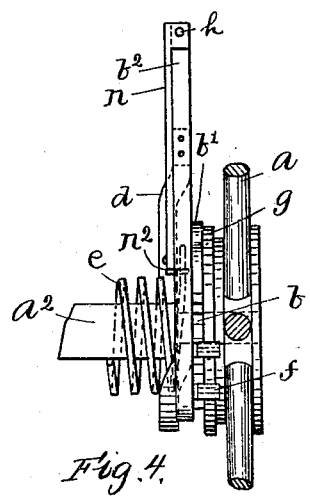
Figure 5:
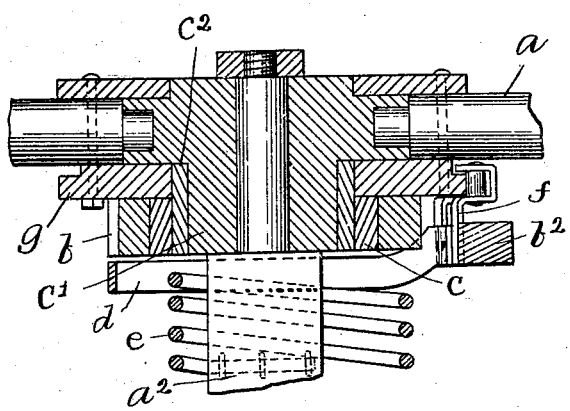
Figure 6:
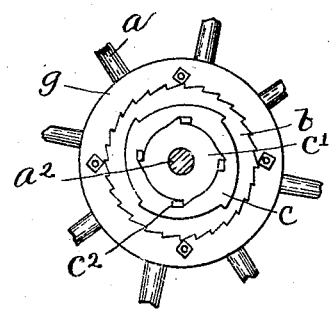

Figure 1 shows in side elevation the running gear of a wagon of ordinary construction provided with means embodying this invention for positively rotating one or more of the wheels to start a heavy load. Fig. 2 is a plan view of the parts shown in Fig. 1. Figs. 3, 4, 5 and 6 are enlarged details of the ratchet clutch mechanism and actuating-lever therefor.

The running gear herein shown comprises a frame $a$, and wheels $a'$ mounted to revolve freely on stationarily supported axles $a^2$. To this frame the usual draft appliance comprising the pole $a^3$ and whiffletrees $a^4$, $a^4$, are connected. This form of running gear and draft appliance is common, and is herein shown merely for the purpose of illustrating one form to which my invention may be applied. The rear wheels $a'$, $a'$, either or both, have connected with them ratchet clutch mechanisms by which they may be positively turned for the purpose of starting a heavy load. The ratchet clutch mechanism consists of a ratchet wheel $b$ secured to the hub of the wheel, a pawl $b'$ arranged to engage the teeth of said ratchet wheel and an actuating-lever $b^2$ to which said pawl is pivoted. The ratchet wheel $b$ is herein shown as a ring see Fig. 6, which is placed upon a ratchet toothed ring $c$, which is in turn mounted upon the ratchet toothed end $c'$ of the hub of the wheel. The ratchet toothed ring $c$ is secured to the hub by keys $c^2$. The end or face of the pawl $b'$ is formed with one or more ratchet teeth to provide for a firm engagement with the ratchet wheel $b$, and said pawl is held up or out of engagement with the ratchet wheel by a spring $b^3$. The actuating lever $b^2$ has a loop-like strap $d$ attached to it, see Fig. 3, which extends around the stationary axle, but more or less remote therefrom, and said lever is supported by a spiral spring $e$, one end of which is attached to the lever and the other end to the stationary axle, said spring encircling the axle. The spring is made quite strong and acts as a return spring for the actuating-lever. At the lower end portion of the actuating-lever one or more short arms $f$ are provided, two being herein shown, which extend laterally therefrom and bear at their extremities, each a roll, and said rolls are arranged to bear upon the edge of a circular plate $g$, which is secured to the hub of the wheel, and thereby provide a rest and guide for the lower end of the lever.

The actuating-lever extends upward a considerable distance and has at its upper end a hole through which a cord $h$ extends, and the end of said cord which passes through said hole is attached to the upper end of an arm $n$, which extends downward and is pivotally connected to the actuating lever. Said arm $n$ forms one arm of a bell-crank lever, the other arm $n'$ of which extends from the actuating-lever and engages or overlies a pin $n^2$ projecting laterally from the pawl $b'$. A spring $n^3$ may or may not be interposed between the arm $n$ and the actuating-lever, which encircles the cord $h$. As the cord $h$ is pulled the bell-crank lever $n$, $n'$ is first operated to move the pawl into engagement with the teeth of the ratchet wheel, then the actuating-lever is operated and its pawl caused to advance the ratchet wheel a short distance and thereby correspondingly turn the wheel and start the load. The opposite end of the cord $h$ is connected to an arm $h'$, which is secured to a sleeve $h^2$ mounted on a fixed bar $h^6$, and to said sleeve an arm $h^3$ is secured which is connected by a cord $h^4$ to the front end of a sliding bar $h^5$, to which one of the whiffletrees is loosely connected. The bar $h^5$ has its bearings in the frame and is movable longitudinally therein. As the whiffletree is pulled forward by the horse the sliding bar will be correspondingly drawn forward and by means of the connections between it and the actuating lever $b^2$ the ratchet clutch mechanism will be operated to start the load. The spring $i$ is employed for returning the sliding bar to its normal position when the strain thereon is relieved.

Ordinarily the wagon will be drawn along as usual, the wheels turning freely on their stationary axles, and at such time the sliding bar will be locked in its normal position and to thus lock the sliding bar a pin $j$ extends down through a hole in the frame and through a hole in said bar. Withdrawal of the pin $j$ releases the sliding bar permitting it to be drawn forward for the purpose of operating the clutch mechanism by which the wheel $a'$ is positively turned to start the load. When the wheel $a'$ is thus operated it serves as a traction wheel. The front axle has arranged on it a guide-roll $m$ over which the cord $h$ passes, said roll being located near the middle of the axle so that the axle may be turned without operating the cord $h$.

In the practice of my invention both rear wheels $a'$ will be provided with appliances of the character described and the stationary bar $h^6$ will have mounted on it two sleeves $h^2$ which are adapted to be independently rocked, and in the case of a two horse wagon the two whiffletrees will be respectively connected with said appliances.

Having thus described my invention, what I claim as new and desire to secure by Letters Patent is:—

1. In a propelling device for wagons, the combination with the running-gear and a draft appliance movable with respect thereto, of a clutch-mechanism connected with one of the wheels, the coöperative parts of which are normally disengaged, an actuating-lever for engaging the coöperative parts of the clutch-mechanism and for operating it to rotate the wheel, means connecting said actuating-lever with the movable draft appliance, means for restoring said draft appliance, and means for restoring said actuating-lever and for disengaging the clutch-mechanism, substantially as described.

2. In a propelling appliance for wagons, the combination with the running-gear, of clutch-mechanisms separately connected with two of the wheels, the coöperative parts of which are normally disengaged, an actuating-lever for each clutch-mechanism, independent means for operating each actuating-lever to engage the coöperative parts of its clutch-mechanism and to operate it to positively rotate the wheel, substantially as described.

3. In a propelling appliance for wagons, the combination with the running-gear, of clutch-mechanisms separately connected with two of the wheels, the coöperative parts of which are normally disengaged, an actuating-lever for each clutch-mechanism, independent means for operating each actuating-lever to engage the coöperative parts of its clutch-mechanism and to operate it to positively rotate the wheel, and means for restoring said lever and for disengaging the clutch-mechanism, substantially as described.

4. In a propelling appliance for wagons, the combination of the running-gear and draft appliance movable with respect thereto, a clutch-mechanism connected with one of the wheels, an actuating-lever therefor, a pivot shaft, an arm at the outer end thereof which is connected with said actuating-lever, an arm at the inner end thereof, and means connecting said inner arm with the draft appliance whereby said shaft is rocked by a forward movement of the draft appliance, substantially as described.

5. In a propelling-device for wagons, the combination with the running gear, of a pair of whiffle-tree supports movably connected therewith, whiffle-trees supported by them, a locking-device for each of said supports, clutch-mechanisms separately connected with two of the wheels, an actuating-lever for each clutch-mechanism, and means connecting said actuating-levers respectively with said whiffle-tree supports, substantially as described.

6. In a propelling-device for wagons, the combination with a running gear, of a pair of whiffle-tree supports movably connected therewith, whiffle-trees supported by them, a locking-device for each of said supports, clutch-mechanisms separately connected with two of the wheels, an actuating-lever for each clutch-mechanism, two pivot-shafts, each having an arm at each end, means connecting the outer arms with the actuating-levers, and means connecting the inner arms with the whiffle-tree supports, substantially as described.

In testimony whereof, I have signed my name to this specification, in the presence of two subscribing witnesses.

WILLIAM H. STEWART.

Witnesses:
B. J. NOYES,
H. B. DAVIS.